Patented Apr. 2, 1946

2,397,627

UNITED STATES PATENT OFFICE 2,397,627

ADHESIVE COMPOSITIONS

Omar H. Smith, West Englewood, N. J., assignor to United States Rubber Company, New York, N. Y., a corporation of New Jersey No Drawing. Application May 13, 1942, Serial No. 442,860

8 Claims. (Cl. 154—2)

This invention relates to improvements in adhesive compositions, and more particularly to adhesive compositions for bonding rubber to metal, and fabrics.

An object of the invention is to provide chemical bonding means which is directly vulcanizable to rubber whereby to provide superior adhesion. A further object is to enhance the adhesion by inclusion of a rubber derivative which is the residue of a solution of rubber depolymerized in solution in the presence of oxygen. Other objects will be apparent from the following description.

It is known that some adhesives adhere satisfactorily to metal and fabrics, but not strongly enough to rubber. Further, some adhesives give adequate adhesion at atmospheric temperatures, but separate readily at higher temperatures. By the present invention, increased adhesion to rubber is provided by virtue of integral bonding of the rubber with a layer containing the aforesaid residue of the partially oxidized and depolymerized rubber in combination with certain partially reacted soluble phenol-aldehyde resins. These phenolaldehyde resins are characterized by the fact that they contain less than the molecular equivalent of aldehyde, and are prepared at temperatures not exceeding the boiling point of water. The average commercial resins that do not have such characteristics will not do. The combination is provided by mixing the depolymerized rubber with the resins in solution or by applying a coating of the resins on a coating of the depolymerized rubber which is contiguous the rubber to be bonded. When it is desirable to employ a mixture of the two, solutions of the resin and the rubber derivative can be mixed merely by shaking together or by moderate stirring. The partially reacted phenolaldehyde resins are relatively permanently stable in the solid state or in solution, and can be applied to metal surfaces from solution without resulting checking or crazing. The rubber derivative is capable of penetrating both the resin film and the rubber cover in the early stages of the subsequent cure and is capable of being cured to a tough non-thermoplastic condition with further heating.

Examples of the resins are crotonaldehyde resorcinol resin, furfural-resorcinol resin, geraniol-resorcinol-formaldehyde resin, and phenol-furfural-formaldehyde resin. These resins are referred to respectively below, as resins C, F, G, and P.

Superior adhesion at elevated temperatures, e. g., 200° F. and higher, is obtained due to the resin being thermosetting and becoming largely infusible during the subsequent curing operation. A resin-hardening agent, e. g., hexamethylene tetramine, can be mixed with the partially reacted resins prior to cure.

The rubber derivative can be prepared from rubber, with or without the separate addition of vulcanizing and/or filling ingredients. The best results are obtained, however, by depolymerizing, in the presence of air (oxygen), the raw rubber dissolved in an organic solvent containing free sulfur, zinc oxide, and an accelerator. A preferred mix (herein referred to as intermediate A) is prepared from zinc oxide, sulfur, and benzothiazole disulfide (Altax) mixed and dissolved in an organic solvent, and the solution heated until the viscosity is decreased by the heat treatment. The temperature of heating the rubber solution should not rise above about 120° C., otherwise the bonding effect of the rubber derivative is materially weakened, when used in conjunction with the thermosetting resin. Ordinary rubber cement is not useful with the thermosetting adhesive.

The following examples are given in illustration of the invention (parts are by weight):

*Example 1.—Preparation of intermediate A*

Intermediate A is prepared from a compound consisting of 100 parts rubber (pale crepe), 3 parts zinc oxide, 8 parts sulfur and 1 part benzothiazyl disulfide by weight. The compound is broken down on a mill and dissolved in toluene, xylene or solvent naphtha. The solution is heated in an air vented container at 100–110° C. until the viscosity drops to approximately 5 centipoises, the rubber concentration being 12% by weight. The viscosity is measured at 25° C. After the heating process is completed, the concentration of the final product is increased to an approximately 25% solution in the solvent, by distilling off a portion of the solvent under vacuum.

The rubber compound can be varied widely. A workable product can be obtained even if sulfur, accelerator and zinc oxide are omitted. Zinc oxide can be omitted without damage to the product if the heating time is increased approximately 10%. However, the compound desirably should contain sulfur or accelerator, and preferably both sulfur and accelerator. The time of heating must be increased approximately 70%, when either sulfur or accelerator is omitted. If both sulfur and accelerator are omitted, the time of heating must be at least doubled, and the final product gives noticeably less adhesion.

The temperature of heating should not exceed

120° C. when the rubber is depolymerized in the presence of sulfur and accelerator, otherwise gelling occurs. Gelling also occurs if the concentration is too high (above 15%) during the initial stages of heating.

Intermediate A cannot be produced in the absence of oxygen (air). For this reason the boiling point of the solvent must be greater than the temperature of the heat treatment; otherwise the solvent vapour above the liquid will expel the air. Either aromatic or aliphatic solvents can be used if the boiling point lies between approximately 120 and 150° C.

The Intermediate A is most effective when it has a viscosity of approximately 5 centipoises, measured at 25° C. with a rubber concentration of 12% (by weight). Its effectiveness is greatly decreased when its viscosity is as high as 15 centipoises or as low as 2.5 centipoises.

It appears that in the above treatment, the rubber is simultaneously partially vulcanized, partially oxidized, and partially depolymerized. Intermediate A is vulcanizable.

Example 2.—Preparation of resin C

Resin C is prepared as follows: 100 parts of resorcinol (by weight) are dissolved in 1000 parts of 1% aqueous sodium hydroxide. The solution is warmed to 40° C. and 50 parts of crotonaldehyde are added with stirring. The mixture is allowed to stand overnight. A thick gum settles to the bottom of the container. The liquid phase is decanted and the residual gum is washed with water, after which it is hardened by allowing it to stand under aqueous 5% hydrochloric acid for approximately 5 hours. The resin is then removed, washed thoroughly with water and crushed. The crushed material is spread out in a thin layer, and allowed to dry in the air. Approximately 100 parts of friable, reddish-brown powder are obtained. The product is insoluble in water, but completely soluble in 1% sodium hydroxide or in a mixture of equal parts of ethyl alcohol and benzene.

Example 3.—Preparation of resin F

Resin F is prepared as follows: 60 parts of resorcinol are dissolved in 500 parts of aqueous 1% sodium hydroxide. 33 parts of furfuraldehyde are added with stirring. The mixture is allowed to stand overnight, after which it is acidified with 10% hydrochloric acid. A grainy precipitate settles to the bottom of the container. The precipitate is filtered, washed with water and dried in the air at room temperature. 50 parts of friable, earth-brown powder are obtained. The product is insoluble in water, but completely soluble in 1% sodium hydroxide or in a mixture of equal parts of ethyl alcohol and benzene.

Example 4.—Preparation of resin G

Resin G is prepared as follows: A mixture of 37 parts resorcinol, 220 parts benzol, 50 parts geraniol and 50 parts zinc chloride (parts by weight) is heated at its boiling point under a reflux condenser for 2 hours. The zinc chloride is allowed to settle after which the supernatant liquid is decanted and washed with warm water in order to remove residual resorcinol or zinc chloride. 110 parts of aqueous 10% formaldehyde are added to the washed liquid and the resulting mixture is heated under a reflux condenser at its boiling point for 2 hours, after which it is allowed to cool and settle. The clear supernatant liquid is decanted and steam distilled. The solid residue from the steam distillation is dried in the air at room temperature. 72 parts of yellow, friable resin are obtained. This resin is soluble in benzene, 1% sodium hydroxide or ethyl alcohol.

Example 5.—Preparation of resin P

Resin P is prepared as follows: 23 parts of phenol (by weight) are dissolved in 200 parts of aqueous 1% sodium hydroxide. 23 parts of furfural are added to the solution and the mixture is heated under a reflux condenser at its boiling point for 1 hour. 50 parts of aqueous 10% formaldehyde are added, and the mixture is refluxed for 1 hour longer. The mixture is then cooled, acidified with 10% hydrochloric acid and brought to the boiling point in order to agglomerate the resin. The resin is separated, washed with water, and allowed to stand overnight under water. It is dried in the air at room temperature. Approximately 25 parts of friable, dark-brown resin are obtained. This resin is soluble in ethyl alcohol or in 1% aqueous sodium hydroxide.

The invention is further illustrated by the examples below:

Two methods were used in determining metal to rubber adhesion. The regular A. S. T. M. method (designation D429-36T) was used in some of the tests. In other examples a stripping test was used. In the latter test metal strips (6" x 1½" x ⅛") which had been sandblasted and cleaned with ethyl alcohol were coated with the adhesive and allowed to air dry. A coat of rubber containing a fabric insertion was then applied and the sample was cured between platens under moderate pressure. The pressure was controlled by means of shims which were placed at the sides of the test piece, and which permitted the rubber cover coat to be compressed from an initial thickness of .100 to a final thickness of .085 inch. Subsequent to curing, the pull which was required to separate the cover coat from the metal was determined.

The cover compound consists (by weight) of 100 parts rubber, 50 parts zinc oxide, 1 part stearic acid, 1 part mercapto-benzothiazole and 3 parts sulfur. This compound, containing a fabric insertion, will be referred to subsequently as cover compound R. Without the fabric insertion, it will be referred to as cover compound $R_1$.

In the examples given subsequently, Resin C, F, G, and P, respectively, are applied in the form of 12% solutions (by weight) in a solvent mixture consisting of equal parts of ethyl alcohol and benzol. Hexamethylene tetramine (hardening agent) in the proportion of 1.2 parts for each 10 parts of resin was added to the resin solutions before applying them to the metal surface.

Intermediate A was used in the form of 25% solution (by weight) in toluene.

Example 6

A coat of resin C was applied to the surface of an A. S. T. M. test plug and air dried. A coat of intermediate A was then applied and air dried for 30 minutes. The cover compound $R_1$ was then applied to the coated surface and the plug was assembled, cured in a mold and tested according to the standard A. S. T. M. method (designation 429-36T). The sample was cured 20 minutes at 307° F. in a preheated mold and cooled in the mold. It was tested at room temperature, and gave an adhesion of 710 pounds per square inch.

Example 7

A similar A. S. T. M. test, employing resin G, intermediate A, and the cover compound R₁ was carried out. The sample was cured 60 minutes at 300° F. The mold was not preheated. The sample was tested at 75° F. and gave an adhesion of 600 pounds per square inch.

*Example 8*

A sample was prepared according to Example 7 and tested at 220° F. It gave an adhesion of 185 pounds per square inch. The separation was entirely in the rubber sandwich and not in the adhesive layer, illustrating the superior heat resistant properties of the adhesive.

*Example 9*

A coat of resin C was applied to the surface of a metal test plate (6" x 1½" x ⅛") and air-dried. A coat of intermediate A was then applied. The coated plate was exposed to the atmosphere for 30 minutes after which the rubber cover compound R was applied. The sample was cured by heating between platens for 60 minutes at 280° F., as described previously. A pull of 25 pounds was applied without separating the cover coat from the metal.

A similar test was made in which ordinary rubber cement, prepared from compound R₁, was substituted for intermediate A. A pull of less than 4 pounds was required to separate the cover coat from the metal, illustrating the importance of the material of intermediate A to the adhesive.

*Example 10*

A test was carried out by the method used in Example 9, employing resin G and intermediate A. A pull of 25 pounds was applied without separating the cover coat from the metal.

A similar test was carried out with the exception that the intermediate coat A was omitted. A pull of less than 4 pounds separated the cover coat from the metal, illustrating the importance of intermediate A to the adhesive.

*Example 11*

A test was carried out by the method used in Example 9, employing resin F and intermediate A. A pull of 25 pounds was applied without separating the cover compound from the metal.

A similar test, omitting intermediate A, was made. Less than 4 pounds was required to separate the cover coat from the metal.

*Example 12*

A test was carried out by the method used in Example 9, employing resin P and intermediate A. A pull of 25 pounds was applied without separating the cover compound from the metal.

A similar test, omitting intermediate A, was made. Less than 4 pounds was required to separate the cover coat from the metal.

*Example 13*

A 10% solution of resin G was mixed with an equal volume of a 10% solution of intermediate A. A square woven cotton fabric was dipped into the mixture and the excess material was removed by wiping the sample between two glass rods, after which the sample was dried.

The material which was added amounted to 10% of the cotton fabric (by weight) dry. The treated fabric was inserted between two layers of the rubber cover compound R, and the assembly was cured for 60 minutes at 285° F. Subsequent to cure, the sample was stripped at 75° F. in a Scott tensile machine. A pull of 26 pounds per inch was required to strip the fabric from the cover compound.

A similar test in which ordinary rubber cement (prepared by dissolving 15 parts by weight of compound R₁ in solvent naphtha) was substituted for the mixture of resin G and intermediate A required a pull of only 21 pounds to strip the cover compound from the fabric.

*Example 14*

A test was carried out according to the method employed in Example 13 with rayon substituted for the cotton fabric. A pull of 13 pounds per square inch was required to separate the rayon from the cover compound.

In a similar test in which the ordinary rubber cement described in Example 13 was substituted for the mixture of resin G and intermediate A, the rayon was separated from the cover coat by a pull of only 3 pounds.

*Example 15*

16.6 parts of resin C which were dissolved in 3% aqueous sodium hydroxide, 16.6 parts of intermediate A in the form of an aqueous emulsion and 1.75 parts hexamethylene tetramine were added to 100 parts latex (on solids basis). The latex solids consisted in parts by weight of 100 rubber, 2.5 zinc oxide, .375 accelerator, 2.5 sulfur, .625 antioxidant, .5 oleic acid, .5 casein and .083 sodium hydroxide. The mixture of resin C, intermediate A, hexamethylene tetramine and latex was diluted with water to a solids concentration of 25%. A webbed fabric was then formed by passing cotton tire cord through the mixture and winding it spirally on a drum with the windings in contact with each other. The web fabric was then dried and removed from the drum. It contained 23.6% by weight of the solution solids. One side of the web fabric was skimmed with a vulcanizable rubber compound, the overall thickness of the skimmed material being approximately .050 inch. A flexing pad was built from six plies of the skimmed web fabric, and was cured by heating it in a mold for 60 minutes at 297° F.

The fatigue value of the flexing pad was determined by the method described by Gibbons in an article in Industrial and Engineering Chemistry, Analytical Edition, volume II, page 99, January 15, 1930. A fatigue value of 623.2 kilocycles was obtained.

A similar test was made in which resin C, intermediate A and hexamethylene tetramine were omitted from the impregnating latex. A fatigue value of only 36.0 kilocycles was obtained.

The invention can be used for bonding rubber to metals, tire cord, fabrics (cotton, wool, silk, rayon, linen), and other materials. It is especially adapted for use where the bond, subsequent to cure, is exposed to temperatures in excess of atmospheric temperatures.

In the above examples, in preparing the bonding agent, Hevea rubber is employed, but other naturally-occurring rubbers as well as artificially-prepared rubbers which are adaptable to vulcanization with sulfur may be used.

Having thus described my invention, what I claim and desire to protect by Letters Patent is:

1. A bonding agent for adhesively uniting surfaces which comprises a rubber derivative obtained by the depolymerizing action of heat and oxygen on dissolved raw rubber in the presence of free sulfur and a vulcanization accelerator, the heating and amount of sulfur being sufficient to bring about a degree of vulcanization equivalent to that attained by heating the rubber in 12% solution until the viscosity of the solution, measured at 25° C., has fallen to a value greater than 2.5 and lower than 15 centipoises, in combination with a partially reacted soluble phenol-aldehyde resin selected from the group consisting of crotonaldehyde-resorcinol, furfural-resorcinol, geraniol-resorcinol-formaldehyde, and phenol-furfural-formaldehyde condensation products, in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

2. A composite article comprising a metal base united to rubber by means of a bonding agent comprising an intermediately disposed layer which includes a rubber derivative obtained by the depolymerizing action of heat and oxygen on dissolved raw rubber in the presence of free sulfur and a vulcanization accelerator, the heating and amount of sulfur being sufficient to bring about a degree of vulcanization equivalent to that attained by heating the rubber in 12% solution until the viscosity of the solution, measured at 25° C., has fallen to a value greater than 2.5 and lower than 15 centipoises, in combination with a partially reacted soluble phenol-aldehyde resin selected from the group consisting of crotonaldehyde-resorcinol, furfural-resorcinol, geraniol-resorcinol-formaldehyde, and phenol-furfural-formaldehyde condensation products in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

3. A bonding agent for uniting rubber to other surfaces which comprises in combination a rubber derivative obtained by the depolymerizing action of heat and oxygen on dissolved raw rubber in the presence of about 8% of sulfur based on the weight of the rubber, and a vulcanization accelerator, the heating being sufficient to bring about a degree of vulcanization equivalent to that attained by heating the rubber in 12% solution until the viscosity of the solution, measured at 25° C., has fallen to a value greater than 2.5 and lower than 15 centipoises, and a partially reacted soluble-phenol-aldehyde resin selected from the group consisting of crotonaldehyde-resorcinol, furfural-resorcinol, geraniol-resorcinol-formaldehyde, and phenol-furfural-formaldehyde condensation products in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

4. A process which comprises adhesively bonding rubber to other surfaces by means of heat and pressure and an intermediately disposed layer which includes a rubber derivative obtained by the depolymerizing action of heat and oxygen on dissolved raw rubber in the presence of free sulfur and a vulcanization accelerator, the heating and amount of sulfur being sufficient to bring about a degree of vulcanization equivalent to that attained by heating the rubber in 12% solution until the viscosity of the solution, measured at 25° C., has fallen to a value greater than 2.5 and lower than 15 centipoises, in combination with a partially reacted soluble phenol-aldehyde resin selected from the group consisting of crotonaldehyde resorcinol, furfural-resorcinol, geraniol-resorcinol-formaldehyde, and phenol-furfural-formaldehyde condensation products, in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

5. A process which comprises adhesively bonding rubber to other surfaces by means of heat and pressure and an intermediately disposed layer which includes a rubber derivative obtained by the depolymerizing action of heat and oxygen on dissolved raw rubber in the presence of free sulfur, zinc oxide, and a vulcanization accelerator, the heating and amount of sulfur being sufficient to bring about a degree of vulcanization equivalent to that attained by heating the rubber in 12% solution until the viscosity of the solution, measured at 25° C., has fallen to a value greater than 2.5 and lower than 15 centipoises, in combination with a partially reacted soluble phenol-aldehyde resin selected from the group consisting of crotonaldehyde resorcinol, furfural - resorcinol, geraniol - resorcinol - formaldehyde, and phenol - furfural - formaldehyde condensation products, in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

6. A bonding agent for uniting rubber to other surfaces which comprises in combination a rubber depolymer obtained from heating a rubber solution in the presence of free sulfur and oxygen, the heating and amount of sulfur being sufficient to bring about a degree of vulcanization equivalent to that attained by heating the rubber in 12% solution until the viscosity of the solution, measured at 25° C., has fallen to a value greater than 2.5 and lower than 15 centipoises, and a partially reacted soluble phenol-aldehyde resin selected from the group consisting of crotonaldehyde-resorcinol, furfural - resorcinol, geraniol-resorcinol-formaldehyde, and phenol-furfural-formaldehyde condensation products, in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

7. A bonding agent for adhesively uniting surfaces which comprises a rubber derivative obtained by the depolymerizing action of heat and oxygen on dissolved raw rubber in the presence of free sulfur and a vulcanization accelerator, the heating and amount of sulfur being sufficient to bring about a degree of vulcanization equivalent to that attained by heating the rubber in 12% solution until the viscosity of the solution, measured at 25° C., has fallen to approximately 5 centipoises, in combination with a partially reacted soluble phenol-aldehyde resin selected from the group consisting of crotonaldehyde-resorcinol, furfural-resorcinol, geraniol-resorcinol - formaldehyde, and phenol-furfural-formaldehyde condensation products, in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

8. A process which comprises adhesively bonding rubber to other surfaces by means of heat and pressure and an intermediately disposed layer which includes a rubber derivative obtained by the depolymerizing action of heat and oxygen on dissolved raw rubber in the presence of free sulfur and a vulcanization accelerator, the heating and amount of sulfur being sufficient to bring about a degree of vulcanization equivalent to that attained by heating the rubber in 12% solution until the viscosity of the solution, measured at 25° C., has fallen to approximately 5 centipoises, in combination with a partially reacted soluble phenol-aldehyde resin selected from the group consisting of crotonaldehyde-resorcinol, furfural-resorcinol, geraniol-resorcinol-formaldehyde, and phenol - furfural - formaldehyde condensation products, in which the proportion of aldehyde reacted with the phenol is less than one mol of aldehyde per mol of the phenol, the amounts of both the depolymerized rubber and the resin being substantial, and a hardening agent for the partially reacted resin, the partially reacted resin being further characterized as being soluble in 1% aqueous solution of sodium hydroxide.

OMAR H. SMITH.